(12) United States Patent  (10) Patent No.: US 8,365,762 B1
Trotter  (45) Date of Patent: Feb. 5, 2013

(54) HYDRAULIC CONTROL SYSTEM

(75) Inventor: Victor D. Trotter, Fort Worth, TX (US)

(73) Assignee: Air Tractors, Inc., Olney, TX (US)

( * ) Notice: Subject to any disclaimer, the term of this patent is extended or adjusted under 35 U.S.C. 154(b) by 386 days.

(21) Appl. No.: 12/687,540

(22) Filed: Jan. 14, 2010

(51) Int. Cl.
*F16K 31/12* (2006.01)

(52) U.S. Cl. ............... 137/487.5; 137/485; 137/486; 251/129.04; 91/361; 91/363 R; 91/358 R; 60/403; 169/53; 244/136

(58) Field of Classification Search ............... 137/485, 137/487.5, 486; 251/129.04; 91/361, 363 R, 91/358 R; 60/403; 169/53; 244/136
See application file for complete search history.

(56) References Cited

U.S. PATENT DOCUMENTS

| | | | | |
|---|---|---|---|---|
| 3,038,449 A | * | 6/1962 | Murphy, Jr. et al. | 91/31 |
| 4,275,752 A | | 6/1981 | Collier et al. | |
| 4,481,768 A | * | 11/1984 | Goshorn et al. | 60/327 |
| 4,714,005 A | * | 12/1987 | Leemhuis | 91/361 |
| 4,766,921 A | | 8/1988 | Williams | |
| 4,901,625 A | * | 2/1990 | Bussan et al. | 91/361 |
| 5,012,722 A | * | 5/1991 | McCormick | 91/361 |
| 5,023,535 A | * | 6/1991 | Miller et al. | 318/599 |
| 5,279,481 A | | 1/1994 | Trotter et al. | |
| 5,294,045 A | | 3/1994 | Harris | |
| 5,313,871 A | * | 5/1994 | Kaneko et al. | 91/361 |
| 5,320,185 A | * | 6/1994 | Foy et al. | 169/43 |
| 5,451,016 A | * | 9/1995 | Foy et al. | 244/136 |
| 5,743,165 A | * | 4/1998 | Tanaka et al. | 91/419 |
| 5,857,333 A | * | 1/1999 | Schmidt et al. | 60/469 |
| 6,003,782 A | * | 12/1999 | Kim et al. | 239/171 |
| 6,003,811 A | * | 12/1999 | Trikha | 244/78.1 |
| 6,019,441 A | | 2/2000 | Lloyd et al. | |
| 6,109,284 A | | 8/2000 | Johnson et al. | |
| 6,367,497 B1 | | 4/2002 | Gautieri et al. | |
| 6,523,451 B1 | * | 2/2003 | Liao et al. | 91/363 R |
| 7,677,154 B2 | * | 3/2010 | Schmidt | 91/454 |
| 2002/0112475 A1 | * | 8/2002 | Cannestra | 60/468 |
| 2005/0000351 A1 | * | 1/2005 | Gast | 91/532 |
| 2007/0217912 A1 | * | 9/2007 | Schmidt | 416/98 |
| 2009/0020161 A1 | | 1/2009 | Jacoby et al. | |
| 2010/0212743 A1 | * | 8/2010 | Li et al. | 137/1 |
| 2012/0286180 A1 | * | 11/2012 | Mehling et al. | 251/129.05 |

* cited by examiner

*Primary Examiner* — John Rivell
*Assistant Examiner* — Minh Le
(74) *Attorney, Agent, or Firm* — Daniel R. Brown; Dan Brown Law Office

(57) ABSTRACT

A control system for transferring fluid between a fluid supply and a process. The control system includes a transfer controller, which outputs a transfer signal that corresponds to a time varying fluid transfer rate, and plural valves that are plumbed in parallel for connection between the fluid supply and the process. Each valve has a corresponding input to receive an actuation signal that enables a closed state or an open state. The system also includes plural means for limiting the rate of fluid flow corresponding to the plural valves, and a valve drive that is coupled to the corresponding inputs of the plural valves, which operates to generate a sequences of valve actuation signals that result in a combined fluid flow rate through the plural valves selected to track the time varying fluid transfer rate defined by a modulated transfer signal within a margin of error. A transfer sensor is engaged to output a feedback signal that is related to the actual time varying transfer of fluid with the process, and a feedback modulator is coupled to modulate the transfer signal with the feedback signal to produce the modulated transfer signal.

58 Claims, 5 Drawing Sheets

ID SYSTEM

BACKGROUND OF THE INVENTION

1. Field of the Invention

The present invention relates to fluid control systems. More particularly, the present invention relates to a multiple solenoid valve, closed loop, hydraulic control system suitable for implementation in aeronautical material dispersal applications.

2. Description of the Related Art

The inventor hereof is also an inventor of U.S. Pat. No. 5,279,481 to Trotter et al. (the "'481 patent"), for Airborne Liquid Spreading System, the entire disclosure of which is hereby incorporated by reference thereto. The '481 patent is directed to an airborne system for dispersing a liquid or other flowable material from an aircraft to the ground below the aircraft. Specific coverage rates are controlled and maintained utilizing a control system, which includes a digital controller that repeatedly calculates a differential pressure across the doors of container holding the liquid or material in the aircraft, and then operates to vary the position of the doors to maintain a constant material flow rate as the differential pressure varies. The control system then closes the doors when a specified volume of material has been dispersed. The control system in the '481 patent utilizes a hydraulic drive system where a digitally controlled proportional hydraulic valve couples hydraulic fluid to drive a rotary actuator to control the position of the doors. A position sensor is coupled to the rotary actuator to provide feedback to the digital controller such that the proportional valve can be effectively controlled within the closed-loop system.

The use of hydraulic proportional control valves implies certain issues in the system design, operation and maintenance. Proportional valves are more expensive, more complex, heavier, and less reliable than simple open-close valves that are typically used in simple open and closed flow control applications. However, simple open-close valves are not well suited to precise control applications because of the "bang-bang" open and close actuation cycle they exhibit. The abrupt operation of such valves induces stresses in mechanical parts, jars loads, and makes precise and intricate control movements difficult. Thus, although simple and economical, open and closed valves are not presently well suited for use in closed loop control system designed for precise and intricate transfers of fluid and control of mechanical processes in a closed loop control system.

By way of an example, a hydraulic proportional valve and hydraulic rotary actuator can be readily employed in an application where it is useful to quickly rotate the actuator to a known position then maintain position within defined error tolerances, particularly in the case of a closed loop positioning application. If open and closed hydraulic valves were substituted and specified with sufficient flow rate capabilities to control the actuator for maximum angular velocity of movement, then the hold-position tolerance required during steady state positioning could not be well maintained due to the high flow rates and actuation time delay inherent in actuating larger "bang-bang" valves. Additionally, acceleration and deceleration of the actuator are not easily or even readily controllable to the extent desirable in precisely operating control system. Thus is can be appreciated that there is a need in the art for a system and method of utilizing open and closed fluid valves in a closed loop control system that address the problems in the art of precise fluid transfer and precise control system operations.

SUMMARY OF THE INVENTION

The need in the art is addressed by the systems and methods of the present invention. The present invention teaches a system for dispersing a flowable substance, which includes any sort of liquids or dry bulk materials, from an aircraft onto the ground, and at a predetermined rate of coverage on the ground. The system includes a tank for carrying the flowable material, which is adapted to be carried by an aircraft, which has an outlet and a gate aligned to engage the outlet. A fluid driven actuator is coupled to selectively move the gate between a closed position and variable open positions whereby the flowable substance is dispersed at controlled rates though a gate opening created between the outlet and the gate. A fluid supply is provided for use with the fluid driven actuator. The fluid system includes a transfer controller, which outputs a transfer signal that corresponds to a time varying fluid transfer rate within the system. Plural valves are plumbed in parallel between the fluid supply and the fluid driven actuator, with each valve having a corresponding input to receive an actuation signal that enables a closed state or an open state for that valve. The system also includes plural means for limiting the rate of fluid flow corresponding to each of the plural valves. A valve drive is coupled to the inputs of the plural valves, and operates to generate a sequences of valve actuation signals that result in a combined fluid flow rate through the plural valves that is calculated to track the time varying fluid transfer rate defined by a modulated transfer signal, and within a margin of error. A position sensor is engaged with the fluid driven actuator, which outputs a feedback signal that is related to the actual time varying position of the fluid driven actuator. A feedback modulator is coupled to modulate the transfer signal with the feedback signal to produce the modulated transfer signal, which is coupled to the valve drive.

In a specific embodiment of the foregoing system, the plural valves include a multi-port directional solenoid valve. In another specific embodiment, the plural means for limiting the rate of fluid flow includes selecting one of the plural valves according to its valve port size, which then limits the fluid flow through it. In another specific embodiment, the plural means for limiting the rate of fluid flow includes a flow limiting orifice. In another specific embodiment, the plural means for limiting flow are selected to provide a graduated rate of flow from a lowest rate of flow to a highest rate of flow. In a refinement to this embodiment, the plural means for limiting flow are graduated by approximately doubling the flow rate from the lowest rate of flow to the highest rate of flow.

In a specific embodiment of the foregoing system, the valve drive is a processor programmed to sequentially enable valve open-state combinations amongst the plural valves that correspond to the time variant instantaneous fluid transfer rate according to the modulated transfer sequence, and within the margin of error. In a refinement to this embodiment, the valve drive processor accesses a predetermined look-up table to determine valve open-state combinations that correspond to the modulated transfer sequence. In another refinement to this embodiment, the valve drive processor modulates at least one of the plural valves between a closed state and an open state to achieve an average fluid transfer rate that is less than the open state flow rate for that valve. In a further refinement, the valve drive processor pulse-width modulates that valve.

In a specific embodiment of the foregoing system, the gate includes at least two doors that are hingedly attached adjacent to the outlet of the tank, and the fluid driven actuator is linked to selectively and cooperatively move the doors. In another specific embodiment, the fluid supply includes a hydraulic oil reserve tank and a hydraulic pump, and the fluid driven actuator is a hydraulic actuator, that may be a rotary actuator or a linear actuator.

In specific embodiment, the foregoing system further includes a means for generating a predetermined flowable substance flow rate through the gate opening signal as a function of time, wherein the flow rate is calculated in accordance with the predetermined rate of coverage and current aircraft performance metrics. This embodiment also includes a means for calculating position data for the fluid driven actuator to obtain the desired flow rate through the gate opening as a function of time, wherein the transfer controller receives the position data and generates the transfer signal to drive the fluid driven actuator as a function of time to selectively control the gate opening corresponding to the position data. In a refinement to this embodiment, the feedback modulator integrates a non-linear feedback signal with a non-linear transfer signal to general a modulated control signal that results in a linear fluid transfer and linear gate movement. In another refinement to this embodiment, the system further includes a pilot interface panel with plural actuators for inputting operational parameters, and the pilot interface panel is coupled to output the predetermined rate of coverage to the means for generating a predetermined flowable substance rate of flow. Also, the means for generating a predetermined flowable substance rate of flow is a digital controller programmed to function as the transfer controller and the feedback modulator, and that operates to output the modulated transfer signal to the valve drive. An analog controller can also be employed to achieve these functions, as will be appreciated by those skilled in the art. In a further refinement, the digital controller is programmed to modulate the transfer signal by subtracting the feedback signal therefrom to produce the modulated transfer signal. In another refinement to this embodiment, the pilot interface panel plural actuators include actuators for entering the specified coverage level, a desired volume of flowable substance to be dispersed, and the ground speed of the aircraft. The pilot interface panel may include a display for displaying the specified coverage level, the desired volume of flowable substance to be dispersed, and the quantity of flowable substance remaining in the tank.

The present invention teaches a control system for transferring fluid between a fluid supply and a process. The control system includes a transfer controller, which outputs a transfer signal that corresponds to a time varying fluid transfer rate, and plural valves that are plumbed in parallel for connection between the fluid supply and the process. Each valve has a corresponding input to receive an actuation signal that enables a closed state or an open state. The system also includes plural means for limiting the rate of fluid flow corresponding to the plural valves, and a valve drive that is coupled to the corresponding inputs of the plural valves, which operates to generate a sequences of valve actuation signals that result in a combined fluid flow rate through the plural valves selected to track the time varying fluid transfer rate defined by a modulated transfer signal within a margin of error. A transfer sensor is engaged to output a feedback signal that is related to the actual time varying transfer of fluid with the process, and a feedback modulator is coupled to modulate the transfer signal with the feedback signal to produce the modulated transfer signal.

[In a specific embodiment of the foregoing system, the fluid is a gas or a liquid. The fluid may be hydraulic oil. In another specific embodiment, the transfer controller is an analog controller, a programmable controller, a microcontroller, a microprocessor, a personal computer, or a digital signal processor. In another specific embodiment, the transfer signal is configured to yield a time varying fluid transfer signal that can be represented as a linear waveform, a non-linear waveform, a ramp waveform, a stepped waveform, or an arbitrary waveform. In another specific embodiment, the system also includes an actuator coupled to the transfer controller, which enables user selection of the transfer signal. In a refinement to this embodiment, the actuator is a switch, a dial, a lever, or a joystick.

In a specific embodiment of the foregoing system, the plural valves include a solenoid valve. In another specific embodiment, the plural valves include a directional valve, and the fluid is transferred to and from the process in response to the transfer signal. In another specific embodiment, the plural valves include a multiple port valve.

In another specific embodiment of the foregoing system, the plural means for limiting the rate of fluid flow includes one of the plural valves that is selected according to its valve port size to limit fluid flow there through. In another embodiment, the plural means for limiting the rate of fluid flow includes a flow limiting orifice. In another embodiment, the plural means for limiting flow are selected to provide a graduated rate of flow from a lowest rate of flow to a highest rate of flow. In a refinement to this embodiment, the plural means for limiting flow are graduated by approximately doubling the flow rate from the lowest rate of flow to the highest rate of flow.

In a specific embodiment of the foregoing system, the valve drive is a processor that is programmed to sequentially enable valve open-state combinations amongst the plural valves that corresponds to the time variant instantaneous fluid transfer rate according to the modulated transfer sequence within the margin of error. In a refinement to this embodiment, the margin of error is defined as the lowest incremental flow rate of one of the plural valves and corresponding means for limiting flow. In another refinement to this embodiment, the valve drive processor employs a predetermined look-up table to determine valve open-state combinations that correspond to the modulated transfer sequence. In another refinement, the valve drive processor is operable to modulate at least one of the plural valves between a closed state and an open state to achieve an average fluid transfer rate that is less than the open state flow rate for such valve. In another refinement to this embodiment, the valve drive processor pulse-width modulates one of the plural valves. In another refinement, the margin of error is defined as the smallest incremental fluid transfer rate change of the pulse-width modulated one of the plural valves.

In a specific embodiment of the foregoing system, the valve drive processor modulates at least two of the plural valves between closed states and open states to achieve an average fluid transfer rate that is less than the open state flow rate for such valves, and also multiplexes the actuation of the at least two of the plural valves over time. In another specific embodiment, the valve drive simultaneously opens at least two of the plural valves to achieve a flow rate equal to the sum of the flow limit through such open valves.

In a specific embodiment of the foregoing system, the feedback modulator generates a feedback signal that compensates for actuation response delay in the plural valves when the transfer signal is modulated with the feedback signal. In another specific embodiment, the transfer sensor, the feedback modulator, and the valve drive combine to operate as a closed loop control system for communicating the transfer signal to control the plural valves. In another specific embodiment, the feedback modulator is a bandpass filter, and its output is subtracted from the transfer signal. In another specific embodiment, the feedback modulator integrates a non-linear feedback signal with a non-linear transfer signal to general a modulated control signal that results in a linear fluid transfer.

In a specific embodiment of the foregoing system, wherein the process is adapted to receive the transfer of fluid from the control system, the transfer sensor is a fluid velocity sensor, a fluid pressure sensor, or a fluid volume sensor. In a refinement to this embodiment, the feedback modulator is adapted for proportional control of fluid velocity, fluid pressure, or fluid volume.

In a specific embodiment of the foregoing system, the system is adapted to couple the transferred fluid with a mechanical transducer, and the transfer sensor is engaged with the mechanical transducer. In a refinement to this embodiment, the mechanical transducer is a fluid driven motor, a fluid driven rotary actuator, or a fluid driven linear actuator. In another refinement, the transfer sensor is a rotary velocity sensor, a rotary position sensor or a linear position sensor. In another refinement, the feedback modulator generates a modulated transfer signal that is adapted for proportional control of angular velocity, angular position, linear velocity, linear position, acceleration, deceleration, or mechanical force.

The present invention teaches a method of transferring fluid using plural valves with plural corresponding flow limiters, each valve operable between a closed state and an open state, plumbed in parallel and connected between a fluid supply and a process. The method includes the steps of generating a transfer signal that corresponds to a time varying fluid transfer rate, modulating the transfer signal with a feedback signal indicative of the actual time varying transfer of fluid with the process, thereby generating a modulated transfer sequence, and also, determining a sequence of valve actuation signals calculated to track the time varying fluid transfer rate defined by the modulated transfer sequence within a margin of error, and coupling the valve actuation signals to the plural valves, thereby yielding a combined fluid flow rate through the plural flow limiters that corresponds to the transfer signal.

In a specific embodiment, the foregoing method includes the further step of selecting the transfer signal by input from an actuator. In another specific embodiment, the method further includes the step of energizing a solenoid to operate at least one of the plural valves between a closed state and an open state. In another specific embodiment of the foregoing method, wherein at least one of the plural valves is a directional valve, the method further includes the steps of actuating the directional valve, and thereby transferring fluid to and from the process in response to the transfer signal.

In another specific embodiment, the foregoing method further includes the step of selecting one of the plural corresponding flow limiters according to valve port size, and thereby limiting fluid flow there through. In another specific embodiment, the method includes the step of including a flow limiting orifice as at least one of the plural corresponding flow limiters. In a refinement to this embodiment, the method further includes the step of graduating the rate of fluid flow through the plural valves by selecting the plural corresponding flow limiters with graduated flow limiting orifice sizes from a lowest rate of flow to a highest rate of flow. In another refinement, the method includes the step of graduating the flow rate from the lowest rate of flow to the highest rate of flow by approximately sequentially doubling the flow rate through the plural corresponding flow limiters.

In a specific embodiment, the foregoing method further includes the steps of sequentially enabling valve open-state combinations amongst the plural valves corresponding to the time variant instantaneous fluid transfer rate according to the modulated transfer sequence within a margin of error. In a refinement to this embodiment, the method further includes the step of defining the margin of error as the lowest incremental flow rate of one of the corresponding flow limiters. In another refinement, the method further includes the step of determining the valve open-state combinations corresponding to the modulated transfer sequence by accessing a predetermined look-up to table. In another refinement, the method further includes the step of modulating at least one of the plural valves between a closed state and an open state, thereby achieving an average fluid transfer rate that is less than the open state flow rate for such valve through its corresponding flow limiter. The modulating step may be accomplished by pulse-width modulation. And, in a further refinement, the margin of error may be defined as the smallest incremental fluid transfer rate change of the pulse-width modulation of the at least the at least one of the plural valves and corresponding flow limiter.

In a specific embodiment, the foregoing method further includes the step of modulating at least two of the plural valves between a closed state and an open state, thereby achieving an average fluid transfer rate that is less than the open state flow rate for such valves and corresponding flow limiters, and multiplexing the actuations thereof over time. In another specific embodiment, the foregoing method further includes the step of simultaneously opening at least two of the plural valves, thereby achieving a flow rate equal to the sum of the flow through such open valves and corresponding flow limiters.

In another specific embodiment, the foregoing method further includes the step of generating a feedback signal that compensates for actuation response delay in the plural valves when the transfer signal is modulated with the feedback signal. In another specific embodiment, the foregoing method further includes the step of operating the plural valves in a closed loop control system for communicating the transfer signal to control the plural valves. In another specific embodiment, the foregoing method further includes the step of integrating a non-linear feedback signal with a non-linear transfer signal, thereby generating a modulated control signal that results in a linear fluid transfer.

In another specific embodiment, wherein the process is adapted to receive the transfer of fluid from the fluid supply, the foregoing method further includes the step of generating a feedback signal corresponding to the transfer of fluid corresponding to the fluid velocity, the fluid pressure, or the fluid volume. In another specific embodiment, and wherein the fluid transfer is coupled to a mechanical transducer, the foregoing method further includes the step of generating the feedback signal by a sensor coupled to the output of the mechanical transducer.

DESCRIPTION OF THE INVENTION

Figure 1:
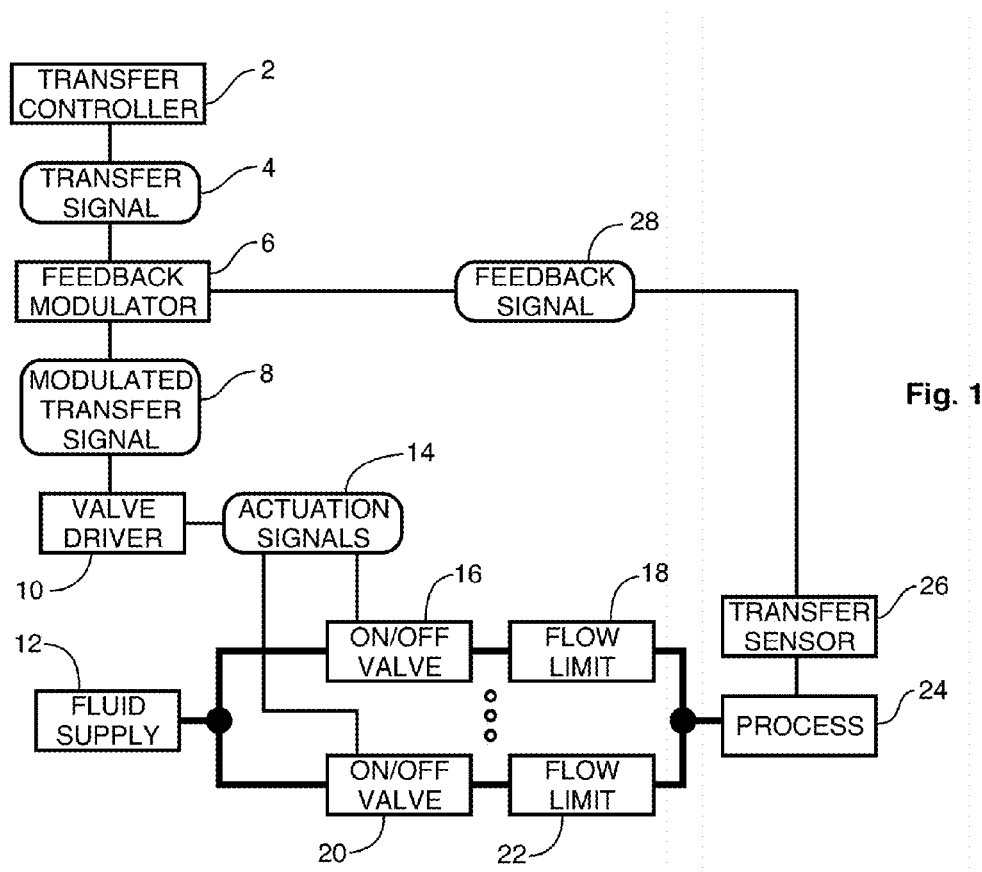
FIG. 1 is a functional block diagram of a fluid control system according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of components to form various apparatus and systems or combinations of steps to accomplish various methods. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention overcomes the problems in the prior art using a fluid valve control system that achieves proportional fluid transfer using plural inexpensive open and closed valves, which are well known in machine, robotic, and other pneumatic and hydraulic fluid system applications. The plural valves are plumbed in parallel and are individually controlled to yield a combined proportional transfer response. That response is achieved, in part, using the plural open-closed valves, each with a means for limiting the flow through that valve. The flow limiting means may be the selection of valves according to their port size, the use of a flow limiting orifices, or other flow limiting technique as are known to those skilled in the art. The flow limiting orifices connected in series with each open-closed valve regulates the transfer of a fluid through each valve. The flow limiting means or orifices can be selected to give each valve a known flow "weight" or contribution to the combined fluid flow. Each valve is actuated by an actuation signal, which may be provided by a microcontroller that can be programmed with one or more algorithms for generating different combinations of actuation signals, or by other analog and digital means as will be discussed further hereinafter or that are otherwise known to those skilled in the art.

In addition to the achievable rangeability of combined flow rates through the plural valves and flow limiters discussed above, the rangeability of flow rates is further enhanced to finer degrees of control by using pulse width modulation control ("PWM") techniques on one or more of the plural valves. In some embodiments, it is useful to PWM control the valve contributing the lowest rate of flow amongst the plural valves. Additionally, a non-linear fluid transfer or mechanical response can be linearized by generating a non-linear actuation signal to produce a non-linear fluid transfer which when combined with the non-linear fluid transfer or mechanical response results in an overall linear system response. The combination of higher flow rate limiters with lower flow rate limiters, as well as PWM control enables rapid fluid transfer or mechanical actuator movement, controllable acceleration and deceleration, as well as precise steady state position control.

Reference is directed to FIG. 1, which is a functional block diagram of a fluid control system according to an illustrative embodiment of the present invention. A fluid supply 12, which provides a pressurized source of fluid, is coupled to plural on-off, or open-closed, valves 16, 20, which are plumbed in parallel. The valves 16, 20 are also coupled to corresponding flow limiting devices 18, 22, which are also plumed in parallel to a process 24 that consumers the fluid or utilizes the energy provided by the fluid. Note that the flow limiting devices 18, 22 may be on either side of the valves or within the valves. The significant feature of the flow limiting devices is that they limit the rate of fluid flow through the valve in the open state. Thus it can be appreciated that actuation of the valves 16, 20 enables transfer of fluid from the fluid supply 12 to the process 24, with the rate of flow of fluid limited by the flow limiters 18, 22. The valves 16, 20 are actuated over time by actuation signals 14 that are provided by a valve drive 10. The valve drive 10 actuation signals 14 are consistent with the valve technology employed in the system. In an illustrative embodiment, electric solenoid valves are used, so the actuation signals are electrical signals. The present invention comprehends all valve control technologies known to those skilled in the art. Since the valves 16, 20 are open-closed valves, the possible combinations of valves states resembles a logical truth table. For example, "0" indicating a closed valve and "1" indicating an open valve. It is also noteworthy to point out that the valves are not "ideal" devices, and do operate with actuation latency and a measurable gradation of flow between the open and closed states. Therefore, it can be appreciated that an idealized truth table of valve states and flow limited rates of fluid flow does not precisely equate to the actual rate of flow, as a function of time, through the plural valves 16, 20. Control system feedback is employed in the illustrative embodiments to mitigate the shortcomings of open-closed valves.

To address the mechanical limitations of valve operation and to address various other system dynamic performance issues discussed hereinafter, the present invention comprehends the use of a transfer sensor 26, which provides a feedback signal 28 that is related to the actual transfer of fluid with the process 24. Various types of sensors can be employed, depending on the type of fluid utilized, a gas or liquid, and the type of process coupled with the system of the present invention. For example, in the case where the fluid is transferred for consumption by the process 24, then a flow meter may be a suitable choice for the transfer sensor 26, and the feedback signal 28 may be a flow rate velocity, volume, or mass, etc. In another example, where the process derives work energy from the fluid transfer, such as with a mechanical actuator, then the transfer sensor 26 may be a mechanical position sensor that outputs a feedback signal 28 that indicates the current position of the actuator, or its velocity or its rate of acceleration, etc. The feedback signal 28 can be employed to vary the valve actuation signals 14 to accommodate the aforementioned valve and flow latency issues, and to embody a closed loop control system that adapts the signaling process to result in a desired process 24 output, including a wide range of system mechanical, electrical and other variables.

Continuing with respect to FIG. 1, a transfer controller 2 outputs a transfer signal 4 that corresponds to a time varying rate of fluid transfer. The transfer signal 4 can be a linear function, a non-linear function, or virtually any arbitrary waveform relating to fluid transfer. The transfer signal 4 can be predetermined, or can be actively generated to meet system performance requirements based on a wide variety of operational parameters. A feedback modulator 6 receives the transfer signal 4 and also receives the feedback signal 28 from the transfer sensor 26. The feedback modulator 6 modulates the transfer signal 6 with the feedback signal to output a modulated transfer signal 8. Thus, those skilled in the art will appreciate that the control system feedback is injected into the closed loop control system by the feedback modulator. By way of example, the feedback signal 28 may be inverted and summed with the transfer signal 4 to result in a classic negative feedback control system. The feedback modulator 6 can also modify the feedback signal 28 in a variety of ways as are know to those skilled in the art. For example, the signal can be filtered, integrated over time, or differentiated to produce a desired or requisite modulated transfer signal 8.

The modulated transfer signal 8 in FIG. 1 is coupled to the valve drive 10. The valve drive 10 functions to translate the time varying modulated transfer signal 8 into a time varying sequence of valve actuation signals 14, which are calculated to generate combined valve flow rates corresponding to the time varying flow rates represented by the modulated transfer signal 8. Due to the digital nature of the valve actuation, and the latency issues discussed above, the flow through the valves 16, 18 under direction of the valve drive 10 operates within an margin of error with respect to the modulated transfer signal 8.

Figure 2:
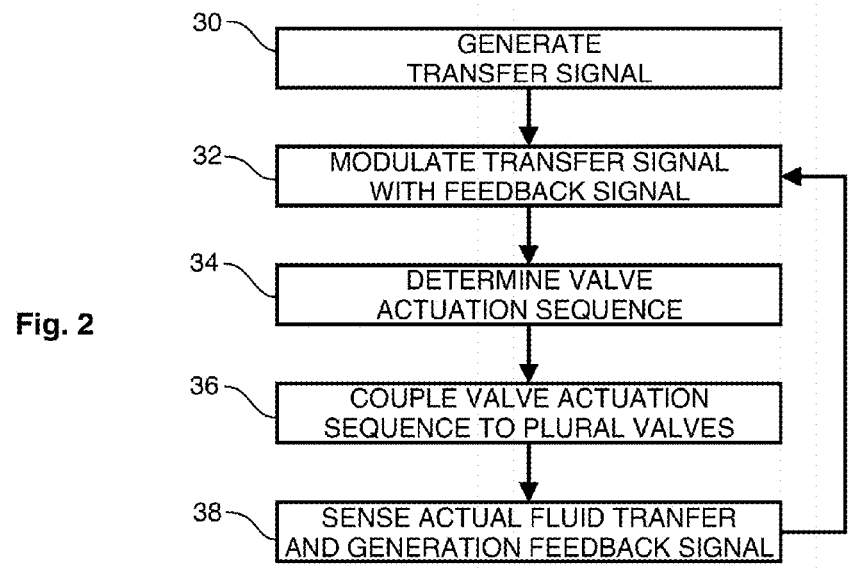
FIG. 2 is a process flow diagram of the operation of a fluid control system according to an illustrative embodiment of the present invention.

Reference is directed to FIG. 2, which is a process flow diagram of the operation of a fluid control system according to an illustrative embodiment of the present invention. FIG. 2 is a generalized process diagram for an embodiment of the present invention. At step 30, a transfer signal, indicative of a time varying rate of fluid transfer, is generated. At step 32, the transfer signal is modulated with a feedback signal to result in a modulated transfer signal, which also corresponds to a time varying rate of fluid transfer. At step 34, the sequence of valve actuations is generated, which is calculated to result in fluid flow through plural valves that tracks the modulated transfer signal within a margin of error. At step 36, the valve actuation sequence is coupled to drive the plural valves to result in actual transfer of fluid with the connected process. At step 38, the actual transfer of fluid is sensed and a corresponding feedback signal is generated, which is coupled back to the aforementioned modulation step.

Figure 3:
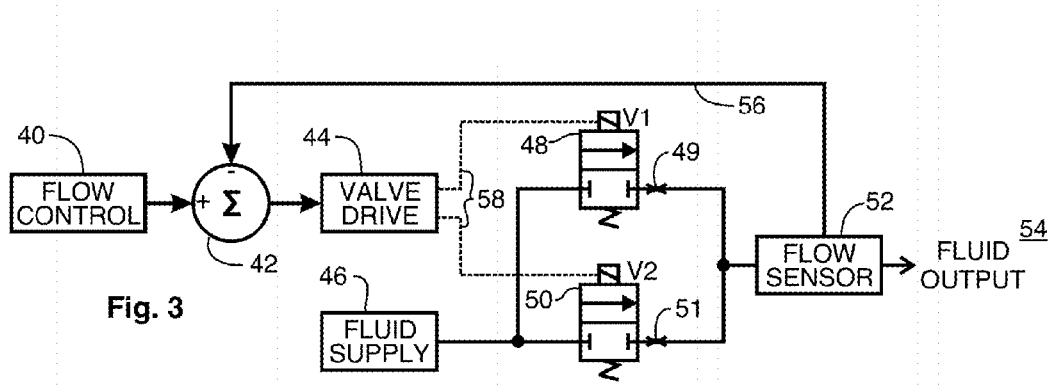
FIG. 3 is a functional block diagram of a fluid control system according to an illustrative embodiment of the present invention.

Reference is directed to FIG. 3, which is a functional block diagram of a fluid control system according to an illustrative embodiment of the present invention. FIG. 3 provides further details of the operation of one illustrative embodiment of the present invention where electric solenoid valves 48, 50 are employed in an electrically controlled system to couple fluid from a fluid supply 46 to a fluid output 54. Note that in this embodiment, the fluid supply 46 is adapted to provide a source of pressurized fluid that maintains a relatively constant supply pressure, varying within a known range of pressures, regardless of fluid transfer rates. The solenoid valves 48, 50 are driven to an open state by a solenoid and are returned to a closed state by a spring in the valve body. Each valve 48, 50 has a corresponding flow limiting orifice 49, 51 plumed in series therewith, which results in a predetermined flow rate through the valve in the open state. While the embodiment of FIG. 3 illustrates two valves 48, 50 plumbed in parallel, that present invention is readily scalable to greater numbers of valves. The greater the number of valves, the finer the resolution of flow rates and the greater the rangeability of fluid transfer become. A valve drive circuit 44 couples valve actuation electric signals 58 to the valves 48, 50 to drive the solenoids and springs between open and closed states of the valves 48, 50. An "on" actuation signal drives a valve open and an "off" actuation signal releases the solenoid current to enable the valve spring to drive the valve closed. In addition to on and off states, the valve drive is operable to modulate individual valve signals on and off rapidly during a short interval of time, and this modulation may be modeled on a pulse width modulation scheme (PWM) to vary the on-time in the valve's duty cycle within that time period. This technique enables the valve to pass a volume of fluid during that time period which is less than the volume transferred during a steady state open condition in that period of time.

Figures 4, 5:
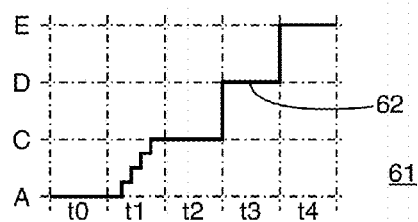
FIG. 4 is a valve state table according to an illustrative embodiment of the present invention.
FIG. 5 is a fluid flow diagram according to an illustrative embodiment of the present invention.

Reference is directed to FIG. 4, which is a valve state table 60 according to an illustrative embodiment of the present invention. The valve state table 60 is similar to a binary truth table, and corresponds to the embodiment discussed with respect to FIG. 3. The table 60 in FIG. 4 shows the state of valve "V1" and "V2", corresponding to valves 48, 50 in FIG. 3, along the FIG. 4 table's vertical columns. The five valve state combinations appear in the horizontal rows. State "A" is where both valves are off, so there is no fluid flow. State "B" is where "V2" is off and "V1" is pulse width modulated. State "C" is where "V2" is closed and "V1" is open in the steady state. State "D" is where "V2" is open and "V1" is closed. State "D" is where both valves are open, and represents the maximum rate of fluid flow through the valve assembly of FIG. 3. In this embodiment, the two valves 48, 50 flow rates are scaled by the flow limiters 49, 51 such that the flow rate through valve "V2" 50 is twice that of valve "V1" 48.

Reference is directed to FIG. 5, which is a fluid flow chart 61 according to an illustrative embodiment of the present invention. The flow chart 61 of FIG. 5 corresponds to the illustrative embodiment of FIG. 3 and the valve state table of FIG. 4. In FIG. 5, the aforementioned valve states appear on the vertical axis and the horizontal axis is divided in to five time periods, labeled "t0", "t1", "t2", "t3", and "t4". During time interval "t0", the valves state is "A", so both valves are closed and there is no fluid transferred to the fluid output 54.

During time interval "t1", valve "V1" is pulse width modulated to gradually increase the flow rate toward the open state flow rate of that valve. During time interval "t2", valve "V1" is at a steady open state so the flow rate corresponds to the limiter 49 rate of flow. At time interval "t3", valve "V1" is closed and valve "V2" is open, so the flow rate is doubled by virtue of the limiter 51 on valve 50. Finally, at time interval "t4", both valves are open and the flow rate reaches its maximum, which is the combined flow rate through limiters 49 and 51. Thus, it can be appreciated that the rangeability of flow in this embodiment results from the combinations of open and closed valve states and the ability to more finely transition between those states by modulating the valve actuations within the stated intervals.

Figure 6:
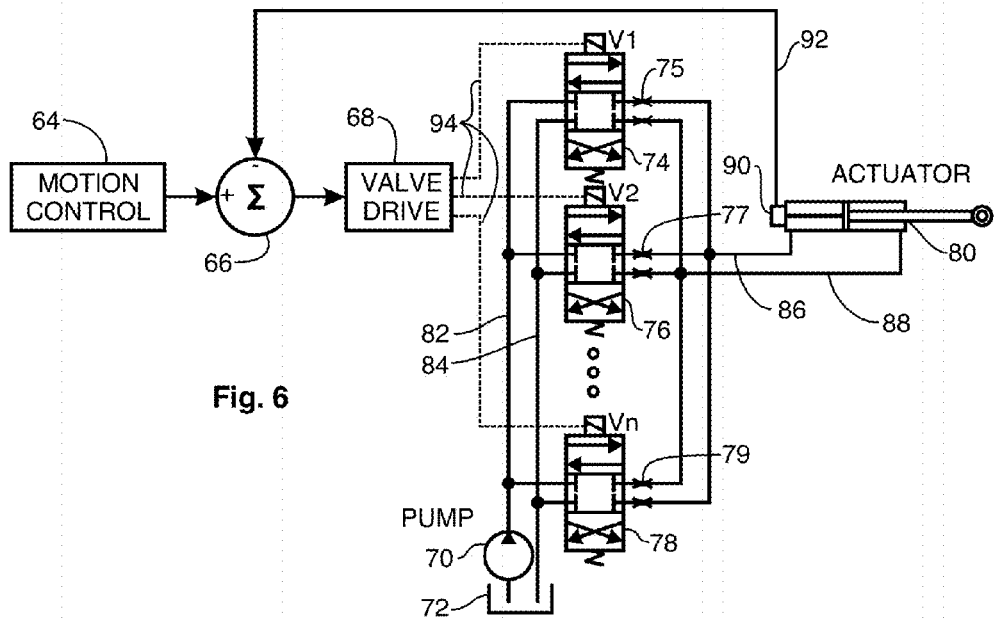
FIG. 6 is a functional block diagram of a fluid control system according to an illustrative embodiment of the present invention.

Reference is directed to FIG. 6, which is a functional block diagram of a fluid control system according to an illustrative embodiment of the present invention. The illustrative embodiment of FIG. 6 illustrates a hydraulic control system configured to operate a dual-acting hydraulic cylinder 80. Thus, in this embodiment, the process of the control system is to actuate a hydraulic cylinder. In order to accomplish this, a hydraulic fluid source is provided, which comprises a hydraulic oil reservoir 72 and a hydraulic pump 70. This provides a relatively constant pressure source of hydraulic energy, varying through a known range of pressures, within hydraulic inlet conduit 82. Also note that the system does not consume the working fluid, so a hydraulic oil return conduit 84 circulates low pressure hydraulic oil back to the reservoir 72. Since the cylinder is dual acting, the plural valves 74, 76, 78 are directional hydraulic valves. In this embodiment, the valves 74, 76, 78 are electric solenoid acting valves, with spring return to the neutral (closed) position. Also note that while three valves 74, 76, 78 are illustrated, the ellipses between valve 76 and valve 78 direct the viewer's attention to the scalability in the number of valves.

Continuing with the discussion of FIG. 6, the three valves 74, 76, 78 are directional valves so each valve is coupled to the supply conduit 82 and the return conduit 84. Actuating the valves in a forward direction circulates hydraulic fluid to the outputs in a first direction, and similarly, actuating the valves in a reverse direction reverses the direction of the fluid at the output of the valves. This arrangement is well know to those skilled in the art. According to this embodiment of the present invention, each of valves 74, 76, 78 has a corresponding pair of flow limiters 75, 77, 79 coupled to both directional output lines. In this way, the flow limit for each valve is controlled regardless of which direction the valve is actuated. The directional outputs of the valves 74, 76, 78 and limiters 75, 77, 79 are summed in parallel and are coupled to the respective directional ports of the hydraulic cylinder via hydraulic conduits 86 and 88. The hydraulic cylinder is fitted with an electronic position sensor 90, as are know to those skilled in the art. Thus, the position of the hydraulic cylinder rod is fed back to the control system of the illustrative embodiment via feedback signal line 92.

The control system of the illustrative embodiment of FIG. 6 comprises a motion controller 64, which outputs a transfer signal to a feedback modulator 66. In this embodiment, the transfer signal is a time varying voltage signal indicative of the position of the hydraulic cylinder 80 rod as a function of time. The feedback modulator is a summing junction that inverts the position sensor 90 feedback signal, thereby inducing a negative feedback signal to the closed loop control system. The feedback modulated transfer signal is then coupled to a valve drive 68. The valve drive 44 compares the time varying modulated control signal voltage with a valve state look-up table of valve state combinations calculated to yield a combined flow rate through the plural valves corresponding to the present signal level of the modulated transfer signal voltage. A margin of error may be defined by the nonlinearity of that transfer and look-up relationship. It will be appreciated that a greater number of valves enables a finer resolution of the flow rates, as does the use of valve modulations techniques, such as pulse width modulation. Also, the cylinder position sensor in this illustrative embodiment is a physical position sensor of the cylinder's piston. The feedback signal is therefore raw position data. Those skilled in the art will appreciate that this information can be translated into relative position, velocity, acceleration, force and other data through the use of differentiation, integration, mathematical analysis, and combinations with other data.

Figure 7:
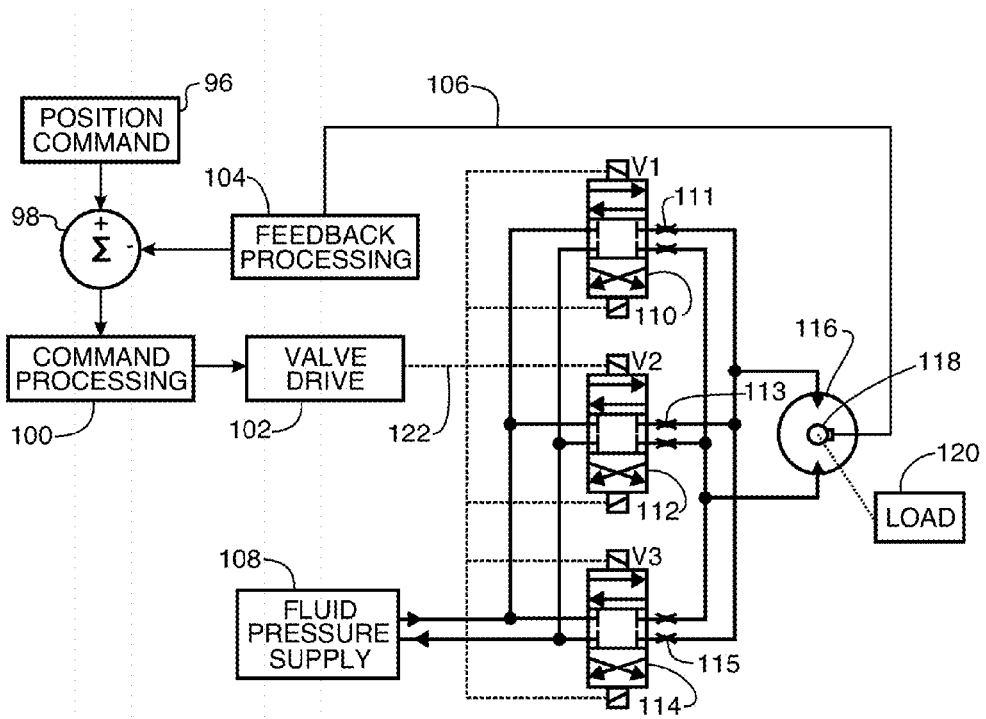
FIG. 7 is a functional block diagram of a fluid control system according to an illustrative embodiment of the present invention.

Reference is directed to FIG. 7, which is a functional block diagram of a fluid control system according to an illustrative embodiment of the present invention. FIG. 7 includes functional blocks and hydraulic schematic elements for a load 120 driving closed loop hydraulic control system. This illustrative embodiment employs three directional hydraulic valves 110, 112, 114, which are plumed in parallel between a hydraulic fluid pressure supply 108 and a rotary hydraulic actuator 116 that drives a mechanical load 120. The valves 110, 112, 114 are electric solenoid driven in either direction and then return to neutral, which is a closed state of the valves. Flow limiting orifices 111, 113, 115 are coupled to the supply and return lines of the valves 110, 112, 114, respectively, to establish a predetermined flow rate from each valve. In this embodiment, the flow rates are doubled from the lowest flow of valve "V1" 110 to the highest flow rate valve "V3" 114 in the binary fashion 1×, 2×, 4×. This arrangement enables eight valve state combinations, ranging from all valves closed to all valves open, which divides the flow volumes into seven evenly graduated steps to maximum flow rate. In addition, the lowest flow rate valve "V1" 110 is pulse modulated to enable finer gradations of flow control through the system.

The actuator 116 in FIG. 7 is a rotary hydraulic actuator that can be driven in either direction and can operate in any hold position, and can accelerate and decelerate through a maximum angular velocity, and so forth. The control system functions to precisely and predictably control that motion according to a predetermined plan of movement. The actual position, velocity, and acceleration are monitored using a rotary position sensor 118 that is coupled to the output shaft of the rotary actuator 116. This provides a position feedback signal that is coupled to a feedback processor 104, which utilizes the raw position data to generate the needed operational parameters, and then may convert that using further processing before it is used to modulate the time varying system position command 96. In this illustrative embodiment, the processed feedback signal is inverted and summed 98 with the position command signal, as negative feedback, to generate a modulated drive command signal by the command processor 100. The command processor couples the modulated drive commands to a valve drive 102, which calculates the valve open and closed actuation signals 122 that are coupled to operate the solenoids in valves 110, 112, 114. It will be appreciated that the use of feedback processing 104 and the generation of a modulated position command 100 enable precise control in this closed looped feedback system. The nonlinearities of the valve actuations and the mechanical response of the load are accommodated in the feedback loop to yield a linear response to a linear position command 96, even though the system is inherently nonlinear. Finer gradations are accommodated though pulse modulation on the valves.

Figure 8:
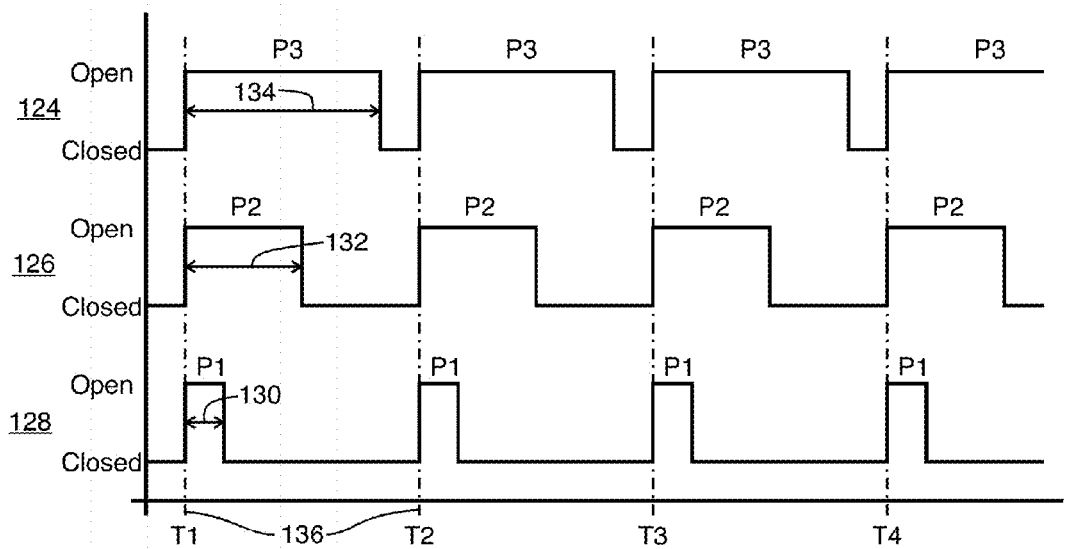
FIG. 8 is a valve state timing diagram according to an illustrative embodiment of the present invention.

Reference is directed to FIG. 8, which is a valve state timing diagram according to an illustrative embodiment of the present invention. As a preliminary matter, it will be appreciated that the steady state open condition of the valve the yields the lowest fluid flow rate, establishes the lowest rate of movement of the rotary actuator in the illustrative embodiment of FIG. 7. However, in precise control applications, it is sometimes necessary to operate at an even slower rate. This is useful where the actuator approaches a hold position, or where the process requires slow action. The present invention contemplates the use of pulse modulation of the valve actuations to achieve finer resolution of fluid transfer and actuator movement. FIG. 7 illustrates a group of valve actuation timing routines to achieve this objective in one embodiment of the present invention. The technique is to employ proportional pulse width modulation. When the required degrees of travel in the actuator is less than the minimum controllable travel using the lowest flow valve steady state flow rate, then that valve, alone, is pulsed with pulse widths that are proportional to the degrees of travel required for the intended movement of the actuator. Consider FIG. 7, which illustrates several PWM timing signals of the same frequency, but with varying duty cycles. Timing signal 128 has a repetitive period between "T1" and "T2" 136, and a low duty cycle pulse width "P1" 130. Timing signal 126 has the same period 136, but a higher open-time duty cycle "P2" 132. Then, timing signal 124 employs a wide open pulse "P3" that approaches the steady state open condition for that valve. Thus, it can be appreciated that varying the duty cycle of the pulse enables the control of the valve gradually up to its steady state open condition. In one illustrative embodiment, utilizing solenoid hydraulic valves, the repetition period is 200 ms and the pulse durations range from 30 ms to 170 ms. The minimum pulse duration is limited by the actuation latency of the valve, which in this illustrative embodiment is slightly less than 30 ms.

Figure 9:
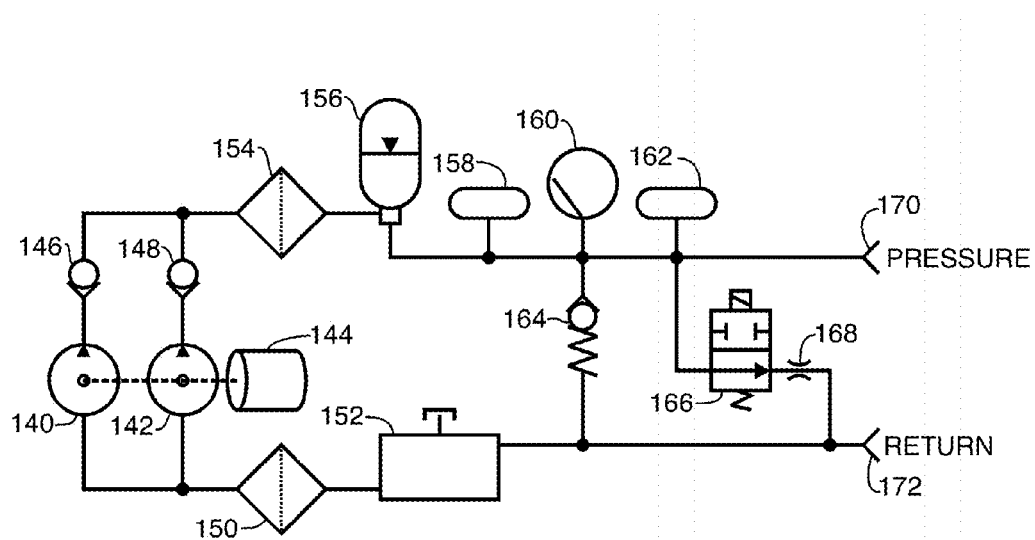
FIG. 9 is a hydraulic schematic of a fluid supply according to an illustrative embodiment of the present invention.
Figure 10:
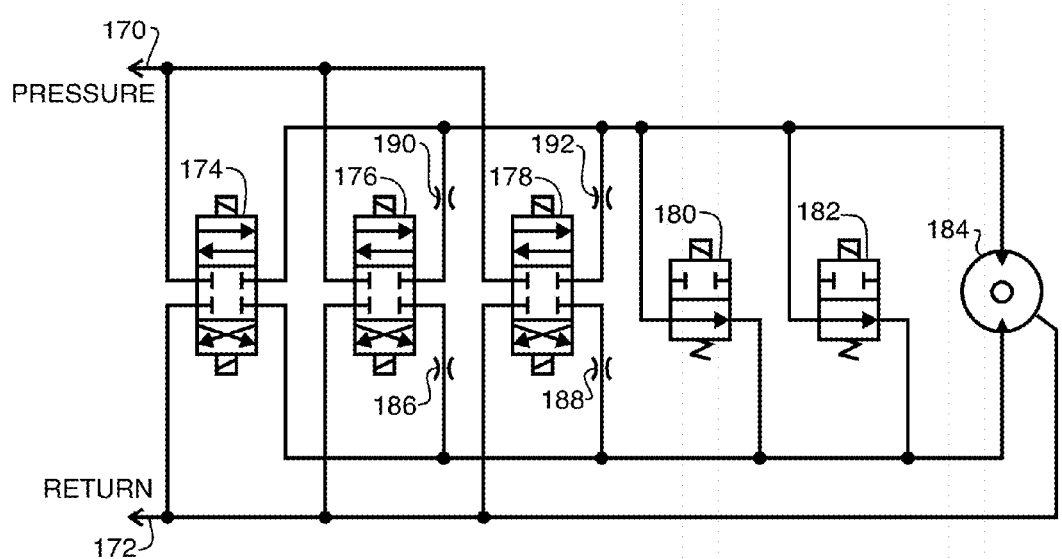
FIG. 10 is a hydraulic schematic in a fluid control system according to an illustrative embodiment of the present invention.
Figure 11:
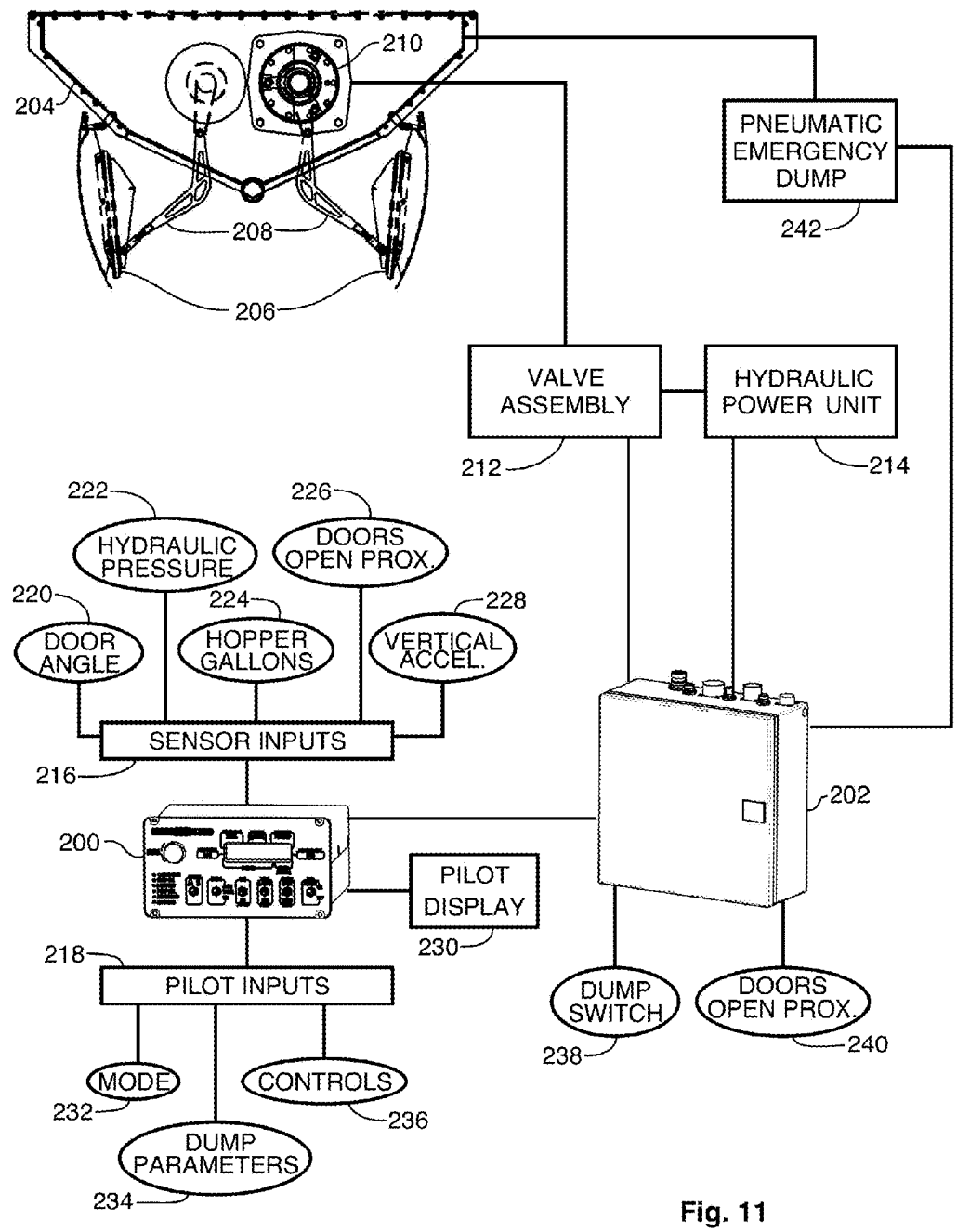
FIG. 11 is a functional block diagram of a aeronautical hydraulic control system according to an illustrative embodiment of the present invention.

One illustrative embodiment of the present invention is applied in the aerial dispersal of flowable materials, such as liquid fire retardants, in a controlled manner. The object of this embodiment is to spread the retardant at a uniform coverage rate over a predetermined ground range, while compensating for a large group of variables in the aircraft and atmospheric dynamics. These include, but are not limited to, aircraft ground speed, aircraft vertical acceleration, retardant tank size, volume, pressure, and other factors. See the aforementioned '481 patent for a more detailed treatment of this complex process. The net result of this process is to produce a real-time fluid transfer signal for driving the closed loop hydraulic system to open and close a tank door so as to disperse the retardant at the requisite rate. Since the system may disperse several hundreds of gallons in a few seconds and since the aircraft is travelling at relatively high air speeds, the precision of door movement becomes readily apparent. FIGS. 9, 10, and 11 illustrate details of this illustrative embodiment of the present invention.

Reference is directed to FIG. 9, which is a hydraulic schematic of a fluid supply system according to an illustrative embodiment of the present invention. A hydraulic oil tank 152 provides a reservoir of working fluid, which passes through a low-pressure filter 150 prior to entering the intakes of a pair of hydraulic pumps 140, 142. A common electric motor drives the pumps 140, 142. The redundant pumps are provided to satisfy the reliability requirements of an airborne firefighting system. The outlets of the pumps 140, 142 are coupled to respective check valves 146, 148, and are then combined so that the pressurized hydraulic fluid is passed through a common high pressure filter 154. One or more pressure accumulator(s) 156 are connected to the pressure manifold 170 to provide reserve pressure and oil capacity to satisfy transient load demands while maintaining manifold pressure. The system pressure is set to approximately 3000 psig. A needle pressure gauge 160 and a pair of pressure transducers 158, 162 provide feedback to the control system of the illustrative embodiment. An over-pressure relief valve 164 is connected between the pressure manifold 170 and the return manifold 172 to prevent the build-up of excessive pressure in the pressure manifold 170. When the system is shut down, and the pumps 140, 142 are disengaged, it is necessary to bleed off system pressure. This is accomplished using a solenoid actuated hydraulic valve 166 and a bleed orifice 168 between the pressure manifold 170 and the return manifold 172. The manifolds 170, 172 are coupled to the valve body of FIG. 10.

Reference is directed to FIG. 10, which is a hydraulic schematic in a fluid control system according to an illustrative embodiment of the present invention. FIG. 10 illustrates the valve body assembly of the illustrative embodiment. A pair of normally-open solenoid driven hydraulic valves 180, 182 are connected between the pressure manifold 170 and the return manifold 172. These valves are held closed while electric power is applied to the solenoids. In the event of a system electric power failure, and certain other system alarm conditions, these valves fail-safe to an open condition, thereby immediately relieving system pressure and releasing the rotary actuator 184 from hydraulic control. The rotary actuator 184 is a single vane unit with approximately 280 degrees of rotation and rated for approximately 26,000 in-lbs at 3000 psi. The control valves of the illustrative embodiment include three directional valves 174, 176, 178, which are solenoid operated 4-way spool valves used to direct hydraulic oil flow in a forward and reverse direction. Such valves are known to those skilled in the art. Fluid transfer limits of the first valve 174 is set by the inherent port size of the valve, and also sets the maximum single-valve flow rate of the system. Flow control of the second valve 176 is set by flow limiting orifices 190 and 186, which are selected to yield a flow rate approximately one-half of that of the first valve 174. Flow control of the third valve 178 is set by flow limiting orifices 192 and 188, which are selected to yield a flow rate approximately one-half of that of the second valve 176. The solenoid valves are driven under supervision and control of the electrical control system of the present invention, which is further detailed with respect to the discussion of FIG. 11.

Reference is directed to FIG. 11, which is a functional block diagram of an aeronautical hydraulic control system according to an illustrative embodiment of the present invention. FIG. 11 illustrates the flowable material tank 204 that is carried by an aircraft and that contains fire retardant liquid in this illustrative embodiment. The tank 204 includes a discharge opening closable with a pair of doors 206 that are hingedly coupled to the tank 204. Plural actuator arms 208 engage the doors 206 and are enabled to selectively open and close the doors by actuation of a rotary actuator assembly 210. The rotary actuator assembly 210 includes a synchronizing gear assembly adapted to cooperatively operate the two doors 206. The rotary actuator assembly 210 also includes a rotary position sensor that outputs a feedback signal as a voltage that varies according to the door angle, and this signal is input as a sensor input 216 for the door angle 220. The rotary actuator assembly is hydraulically driven by the aforementioned valve assembly (reference to FIG. 10), which is functionally depicted as item 212 in FIG. 11. The hydraulic power unit 214 corresponds generally to FIG. 9.

The control system of the illustrative embodiment comprises a pilot interface unit 200 cooperatively interfaced with a relay enclosure 202. The pilot interface contains processor and logic circuits implement to perform the processes of the illustrative embodiment. These comprise, among other functions, the main system microprocessor used to control all logic functions, monitor analog and digital sensor inputs, monitor diagnostics inputs and system status display data, power and control circuits, message and status circuits, and various inputs and control devices. More particularly, the sensor inputs include the aforementioned door angle sensor input 220, the hydraulic pressure sensor input 222, the tank volume "hopper gallons" input 224, the door open proximity sensor input 226, and the vertical acceleration sensor input 228. The pilot interface is also coupled to a pilot display 230, which is used to provide system information and confirm pilot inputs and commands. Several pilot inputs 218 are also coupled to the pilot interface 218, that these comprise a mode selector 232, dump parameter inputs 234, and other controls 236. The interface between the pilot interface 200 and the relay and control enclosure 202 contains plural signal lines, which control various switching functions and interface functions in the relay enclosure 202. In particular, these include the solenoid drive lines carrying the valve actuation signals to the valve assembly 212, and the electrical interfaces to the hydraulic power unit. These where elsewhere discussed with respect to FIGS. 9 and 10 hereinbefore. Also, an emergency dump switch 238 a door open proximity sensor 240 are coupled to the relay enclosure 202. Again, the reader is referred to the '481 patent for a more detailed discussion of the aeronautic control functions.

With regards to the specific operating and performance metrics of the aeronautical illustrative embodiment, specific design criteria for that embodiment will now be discussed. It should be noted that this is a particular design generated to satisfy a very particular operating environment, aircraft loading and fire fighting application. This skilled in the art will appreciate that given another set of design criteria, or another area of technology and application of the teachings herein, the design specification will most likely differ, and could differ greatly. As discussed hereinbefore, the aeronautic embodiment employs three control valves with flow limiting means calibrated by cross section area as follows:

Valve 1, Orifice Area=1A

Valve 2, Orifice Area=2A

Valve 3, Orifice Area=4A

Where: A=area with units of length squared

The impedance to flow for each orifice is selected so that the various combinations of valve actuation will yield the desired output flow. One method of selecting the orifice resistance values is to use a binary coded decimal ("BCD") weighting method so that the flow area each orifice is selected as:

Orifice Area=$K*2^N$

Where:

K=Constant

N=Number of valves

A flow rate that ranges from between 0~7 for a given constant supply pressure is achieved by controlling the valves as shown in Table 1.

TABLE 1

BCD implementation for ON/OFF valve orifice selection.

| Speed Setting | Valve 3 Orifice Area = 4A | Valve 2 Orifice Area = 2A | Valve 1 Orifice Area = 1A |
|---|---|---|---|
| 1 | OFF | OFF | ON |
| 2 | OFF | ON | OFF |
| 3 | OFF | ON | ON |
| 4 | ON | OFF | OFF |
| 5 | OFF | OFF | ON |
| 6 | ON | ON | OFF |
| 7 | ON | ON | ON |

Performance of the illustrative embodiment is tabulated below, in Table 2.

TABLE 2

Hydraulic actuator speed versus valves activated.

| | Hydraulic Valve Logic Table | | | Empirical Data | |
|---|---|---|---|---|---|
| Speed Setting | Orifice Valve 1 0.096" | Orifice Valve 2 0.063" | Orifice Valve 3 0.046" | Rotate Actuator CCW Deg/Sec {3} | Rotate Actuator CW Deg/Sec {3} |
| PWM | OFF | OFF | PWM | 10~102 | 10~116 |
| 1 | OFF | OFF | ON | 102 | 116 |
| 2 | OFF | ON | OFF | 232 | 202 |
| 3 | OFF | ON | ON | 328 | 322 |
| 4 | ON | OFF | OFF | 360 | 449 |
| 5 | OFF | OFF | ON | 491 | 562 |
| 6 | ON | ON | OFF | 603 | 623 |
| 7 | ON | ON | ON | 683 | 711 |

Table Notes:
1. The PWM effect on Speed Setting 1 is estimated and is dependent on valve characteristics.
2. Speeds much lower than 10 deg/sec are possible but the actuator, will start and stop as it tracks the input ramp signal.
3. Hydraulic oil flow rate is proportional to actuator rotation speed.

The signals may be provided by a microcontroller that can be preprogrammed to produce a variety of signal types, including ramp, ramp-like, and non-linear. The result of this illustrative embodiment is a relatively simple, low-cost valve system providing a greater degree of control and smoothness of media transfer than is currently available without using numerous expensive proportional valves or complex valve actuation schemes. The preferred control system also allows for application specific customization, including linearization of non-linear mechanical responses.

The tracking precision of the illustrative embodiment system is a function of orifice selection, valve speed, and processing speed. In the illustrative embodiment, the system tracks in input signal to within plus or minus two degrees. And, it can move from zero degrees to 202 degrees in approximately 0.3 seconds. The actuator speeds for the various orifices are shown in Table 3, presented below.

TABLE 3

Performance Data

| Error (deg.) | Actuator (deg./sec.) | Average Flow Rate |
|---|---|---|
| 0 | 0 | 0.00% |
| 1.99 | 0 | 0.00% |

TABLE 3-continued

Performance Data

| Error (deg.) | Actuator (deg./sec.) | Average Flow Rate |
|---|---|---|
| 2 | 3.175 | 0.46% |
| 10 | 50.8 | 7.44% |
| 10.1 | 102 | 14.93% |
| 15 | 232 | 33.97% |
| 20 | 328 | 48.02% |
| 25 | 360 | 52.71% |
| 30 | 491 | 71.89% |
| 35 | 603 | 88.29% |
| 40 | 683 | 100.00% |

The door speed can vary from approximately 110 deg/sec to 700 deg/sec depending on what valves are turned on in roughly 12.5% increments. Since the lowest flow rate limited valve is PWM'd, the minimum door speed is can be slowed even slower that the orifice and system parameters would dictate. Approximations of the PWM control functions of this particular illustrative embodiment follow. Every 154 milliseconds a pulse is generated only if the error is larger than the allowable amount. If the error is small, the width of the pulse is about 34 milliseconds and the actuator will move about 0.5 degrees per "pulse". If the error is large (e.g. 10%) the width of the pulse is approximately 90 milliseconds and the actuator will move about 6 to 8 degrees per "pulse". Again, refer to Table 3. More particularly, the period of pulse train is 157.3 milliseconds or 6.35 hertz. If the error is less than 2 degrees, no pulses are sent. If the error is exactly 2 degrees, one 33.7 ms pulse would occur every 157.3 milliseconds, the actuator moves about 0.5 degrees/pulse, and the average rotational speed is about 3.175 degrees/second. If the error was exactly 10 degrees, then one 89.8 ms pulse would occur every 157.3 ms, the actuator moves about 8 degrees per pulse, and the average rotational speed is about 50.8 degrees/second. If the margin for error falls between 2 degrees and 10 degrees, then the pulse width varies from 30 to 70 milliseconds in proportion to the error. And, if the error is slightly greater than 10 degrees, the lowest flow rate valve is fully opened, and the rotational speed is approximately 110 degrees per second. Note that for larger error amounts Table 3 provides the actuator speed.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for dispersing a flowable substance, including liquids and dry bulk materials, from an aircraft onto the ground at a predetermined rate of coverage, comprising:
   a tank with an outlet, adapted to be carried by the aircraft, for containing the flowable substance;
   a gate aligned to engage said outlet;
   a fluid driven actuator coupled to selectively move said gate between a closed position and variable open positions whereby the flowable substance is dispersed at controlled rates though a gate opening created between said outlet and said gate;
   a fluid supply;
   a transfer controller, which outputs a transfer signal that corresponds to a time varying fluid transfer rate;
   plural valves, plumbed in parallel between said fluid supply and said fluid driven actuator, each having a corresponding input to receive an actuation signal that enables a closed state or an open state;
   plural means for limiting the rate of fluid flow corresponding to said plural valves;
   a valve drive, which is a processor programmed to couple a sequence of valve open-state combinations that are updated at repetitive predetermined time intervals, coupled to said corresponding inputs of said plural valves, and thereby generate a sequence of valve actuation signals that result in a combined fluid flow rate through said plural valves selected to track the time varying fluid transfer rate defined by a modulated transfer signal within a margin of error, which is defined as the lowest incremental flow rate, during one of said predetermined time intervals, of one of said plural valves and corresponding means for limiting flow;
   a position sensor engaged with said fluid driven actuator and operable to output a feedback signal related to the actual time varying position of said fluid driven actuator;
   a feedback modulator coupled to modulate said transfer signal with said feedback signal to produce said modulated transfer signal, and wherein
   said valve drive is further operable to pulse width modulate at least one of said plural valves between a closed state and an open state to achieve an average fluid transfer rate within one of said predetermined time intervals that is less than said margin of error.

2. The system of claim 1, and wherein:
said plural valves include a multi-port directional solenoid valve.

3. The system of claim 1, and wherein:
said plural means for limiting the rate of fluid flow includes one of said plural valves selected according to valve port size to limit fluid flow there through.

4. The system of claim 1, and wherein:
said plural means for limiting the rate of fluid flow includes a flow limiting orifice.

5. The system of claim 1, and wherein
said plural means for limiting flow are selected to provide a graduated rate of flow from a lowest rate of flow to a highest rate of flow.

6. The system of claim 5, and wherein:
said plural means for limiting flow are graduated by approximately doubling the flow rate from said lowest rate of flow to said highest rate of flow.

7. The system of claim 1, and wherein:
said valve drive is a processor, selected from a digital processor and an analog processor, programmed to sequentially enable valve open-state combinations amongst said plural valves that corresponds to the time variant instantaneous fluid transfer rate according to said modulated transfer sequence within said margin of error.

8. The system of claim 7, and wherein:
said valve drive processor accesses a predetermined look-up table to determine valve open-state combinations that correspond to said modulated transfer sequence.

9. The system of claim 1, and wherein:
said gate comprises at least two doors hingedly attached adjacent to said outlet of said tank, and wherein
said fluid driven actuator is linked to selectively and cooperatively move all of said at least two doors.

10. The system of claim 1, and wherein:
said fluid supply comprises an hydraulic oil reserve tank and a hydraulic pump, and said fluid driven actuator is a hydraulic actuator, selected from a rotary actuator and a linear actuator.

11. The system of claim 1, further comprising:
means for generating a predetermined flowable substance flow rate through said gate opening as a function of time, wherein said flow rate is calculated in accordance with the predetermined rate of coverage and current aircraft performance metrics;
means for calculating position data for said fluid driven actuator to obtain said desired flow rate through said gate opening as a function of time, and wherein
said transfer controller is operable to receive said position data and generate said transfer signal to drive said fluid driven actuator as a function of time to selectively control said gate opening corresponding to said position data.

12. The system of claim 11, and wherein:
said feedback modulator integrates a non-linear feedback signal with a non-linear transfer signal to generate a modulated control signal that results in a linear fluid transfer and linear gate movement.

13. The system of claim 11, further comprising:
a pilot interface panel having plural actuators for inputting operational parameters, said pilot interface panel coupled to output said predetermined rate of coverage to said means for generating a predetermined flowable substance rate of flow, and wherein
said means for generating a predetermined flowable substance rate of flow is a digital controller programmed to function as said transfer controller and said feedback modulator, and operable to output said modulated transfer signal to said valve driver.

14. The system of claim 13, and wherein
said digital controller is programmed to modulate said transfer signal by subtracting said feedback signal therefrom to produce said modulate transfer signal.

15. The system of claim 13, and wherein
said pilot interface panel includes actuators for entering the specified coverage level, a desired volume of flowable substance to be dispersed, and the ground speed of the aircraft.

16. The system of claim 13 and wherein
said pilot interface panel further comprises at least one display for displaying the specified coverage level, the desired volume of flowable substance to be dropped, and the quantity of flowable substance remaining in the container.

17. A control system for transferring fluid between a fluid supply and a process, comprising:
a transfer controller, which outputs a transfer signal that corresponds to a time varying fluid transfer rate;
plural valves plumbed in parallel for connection between the fluid supply and the process, each having a corresponding input to receive an actuation signal that enables a closed state or an open state;
plural means for limiting the rate of fluid flow corresponding to said plural valves;
a valve drive, which is a processor programmed to couple a sequence of valve open-state combinations that are updated at repetitive predetermined time intervals coupled to said corresponding inputs of said plural valves, and thereby generate a sequence of valve actuation signals that result in a combined fluid flow rate through said plural valves selected to track the time varying fluid transfer rate defined by a modulated transfer signal within a margin of error, which is defined as the lowest incremental flow rate, during one of said predetermined time intervals, of one of said plural valves and corresponding means for limiting flow;
a transfer sensor engaged to output a feedback signal related to the actual time varying transfer of fluid with the process;
a feedback modulator coupled to modulate said transfer signal with said feedback signal to produce said modulated transfer signal, and wherein
said valve drive is further operable to pulse width modulate at least one of said plural valves between a closed state and an open state to achieve an average fluid transfer rate within one of said predetermined time intervals that is less than said margin of error.

18. The control system of claim 17, wherein the fluid is selected from a gas and a liquid.

19. The control system of claim 17, wherein the fluid is hydraulic oil.

20. The control system of claim 17, wherein said transfer controller is selected from a programmable controller, a microcontroller, a microprocessor, a personal computer, and a digital signal processor.

21. The control system of claim 17, wherein said transfer signal is configured to yield a time varying fluid transfer representable as a linear waveform, a non-linear waveform, a ramp waveform, a stepped waveform, or an arbitrary waveform.

22. The control system of claim 17, further comprising:
a pilot input control, coupled to said transfer controller, for user selection of said transfer signal.

23. The control system of claim 22, and wherein
said pilot input control is selected from a switch, a dial, a lever and a joy-stick.

24. The control system of claim 17, and wherein:
said plural valves include a solenoid valve.

25. The control system of claim 17, and wherein:
said plural valves include a directional valve, and wherein said the fluid is transferred to and from the process in response to said transfer signal.

26. The control system of claim 17, and wherein
said plural valves include a multiple port valve.

27. The control system of claim 17, and wherein:
said plural means for limiting the rate of fluid flow includes one of said plural valves selected according to valve port size to limit fluid flow there through.

28. The control system of claim 17, and wherein:
said plural means for limiting the rate of fluid flow includes a flow limiting orifice.

29. The control system of claim 17, and wherein
said plural means for limiting flow are selected to provide a graduated rate of flow from a lowest rate of flow to a highest rate of flow.

30. The control system of claim 29, and wherein:
said plural means for limiting flow are graduated by approximately doubling the flow rate from said lowest rate of flow to said highest rate of flow.

31. The control system of claim 17, and wherein:
said valve drive processor employs a predetermined look-up table to determine valve open-state combinations that correspond to said modulated transfer sequence.

32. The control system of claim 17, and wherein:
said valve drive processor is operable to modulate at least two of said plural valves between closed states and open states to achieve an average fluid transfer rate that is less than the open state flow rate for such valves, and operable to multiplex the actuation of said at least two of said plural valves over time.

33. The control system of claim 17, and wherein:
said valve drive is operable to simultaneous open at least two of said plural valves to achieve a flow rate equal to the sum of the flow limit through such open valves.

34. The control system of claim 17, and wherein:
said feedback modulator is adapted to generate a feedback signal that compensates for actuation response delay in said plural valves when said transfer signal is modulated with said feedback signal.

35. The control system of claim 17, and wherein:
said transfer sensor, said feedback modulator, and said valve drive combine to operate as a closed loop control system for communicating said transfer signal to control said plural valves.

36. The control system of claim 17, and wherein:
said feedback modulator is a bandpass filter, which output is subtracted from said transfer signal.

37. The control system of claim 17, and wherein:
said feedback modulator integrates a non-linear feedback signal with a non-linear transfer signal to generate a modulated control signal that results in a linear fluid transfer.

38. The control system of claim 17 wherein the process is adapted to receive the transfer of fluid from the control system, and wherein:
said transfer sensor is selected from a fluid velocity sensor, a fluid pressure sensor, and a fluid volume sensor.

39. The control system of claim 38, and wherein:
said feedback modulator is adapted for proportional control of fluid velocity, fluid pressure, or fluid volume.

40. The control system of claim 17, and wherein:
the process is adapted to couple the transferred fluid with a mechanical transducer, and wherein
said transfer sensor is engaged with said mechanical transducer.

41. The control system of claim 40, and wherein:
said mechanical transducer is selected from a fluid driven motor, a fluid driven rotary actuator, and a fluid driven linear actuator.

42. The control system of claim 40, and wherein
said transfer sensor is selected from a rotary velocity sensor, a rotary position sensor and a linear position sensor.

43. The control system of claim 41, and wherein:
said feedback modulator generates a modulated transfer signal adapted for proportional control of angular velocity, angular position, linear velocity, linear position, acceleration, deceleration, or mechanical force.

44. A method of transferring fluid using plural valves with plural corresponding flow limiters, each valve operable between a closed state and an open state, plumbed in parallel and connected between a fluid supply and a process, the method comprising the steps of:
generating a transfer signal that corresponds to a time varying fluid transfer rate; modulating said transfer signal with a feedback signal indicative of the actual time varying transfer of fluid with the process, thereby generating a modulated transfer sequence signal;
determining a sequence of valve actuation signals occurring at repetitive predetermined time intervals, and calculated to track the time varying fluid transfer rate defined by said modulated transfer signal within a margin of error, which is defined as the lowest incremental flow rate, during one of the predetermined time intervals, for one of the plural valves and corresponding means for limiting flow;
pulse width modulating at least one of the plural valves between a closed state and an open state to achieve an average fluid transfer rate within one of the predetermined time intervals that is less than said margin of error, and
coupling said valve actuation signals to the plural valves, thereby yielding a combined fluid flow rate through the plural flow limiters that corresponds to said transfer signal.

45. The method of claim 44, further comprising the step of:
selecting the transfer signal by input from a pilot input control.

46. The method of claim 44 further comprising the step of:
energizing a solenoid to operate at least one of the plural valves between a closed state and an open state.

47. The method of claim 44, wherein at least one of the plural valves is a directional valve, and further comprising the steps of:
actuating the directional valve, and thereby transferring fluid to and from the process in response to said transfer signal.

48. The method of claim 44, further comprising the step of:
selecting one of the plural corresponding flow limiters according to valve port size, and thereby limiting fluid flow there through.

49. The method of claim 44, further comprising the step of:
including a flow limiting orifice as at least one of the plural corresponding flow limiters.

50. The method of claim 49, further comprising the step of:
graduating the rate of fluid flow through the plural valves by selecting the plural corresponding flow limiters with graduated flow limiting orifice sizes from a lowest rate of flow to a highest rate of flow.

51. The method of claim 50, further comprising the step of:
graduating the flow rate from the lowest rate of flow to the highest rate of flow by approximately sequentially doubling the flow rate through said plural corresponding flow limiters.

52. The method of claim 44, further comprising the step of:
determining the valve open-state combinations corresponding to said modulated transfer sequence by accessing a predetermined look-up to table.

53. The method of claim 44, further comprising the step of:
simultaneously opening at least two of the plural valves, thereby achieving a flow rate equal to the sum of the flow through such open valves and corresponding flow limiters.

54. The method of claim 44, further comprising the step of:
generating a feedback signal that compensates for actuation response delay in the plural valves when said transfer signal is modulated with said feedback signal.

55. The method of claim 44, further comprising the step of:
operating said plural valves in a closed loop control system for communicating said transfer signal to control the plural valves.

56. The method of claim 44, further comprising the steps of:
integrating a non-linear feedback signal with a non-linear transfer signal, thereby generating a modulated control signal that results in a linear fluid transfer.

57. The method of claim 44 wherein the process is adapted to receive the transfer of fluid from the fluid supply, and further comprising the step of:
generating a feedback signal corresponding to the transfer fluid corresponding to the fluid velocity, the fluid pressure sensor, or the fluid volume.

58. The method of claim 44, and wherein the actual time varying transfer of fluid is coupled to a mechanical transducer, and further comprising the step of:
generating said feedback signal with a sensor coupled to the output of the mechanical transducer.

* * * * *